United States Patent
Ohkoshi et al.

(10) Patent No.: US 12,157,160 B2
(45) Date of Patent: Dec. 3, 2024

(54) CAN LID

(71) Applicant: Daiwa Can Company, Tokyo (JP)

(72) Inventors: Toshiyuki Ohkoshi, Tokyo (JP); Hirokazu Konagaya, Shizuoka (JP); Tadayosi Iwamaru, Mohka (JP); Akira Yamamoto, Mohka (JP); Katsumi Ohshima, Mohka (JP); Junji Matsumura, Sagamihara (JP)

(73) Assignee: DAIWA CAN COMPANY, Tokyo (JP)

( * ) Notice: Subject to any disclaimer, the term of this patent is extended or adjusted under 35 U.S.C. 154(b) by 750 days.

(21) Appl. No.: 17/142,733

(22) Filed: Jan. 6, 2021

(65) Prior Publication Data

US 2021/0121936 A1  Apr. 29, 2021

Related U.S. Application Data

(63) Continuation of application No. PCT/JP2019/027757, filed on Jul. 12, 2019.

(30) Foreign Application Priority Data

Jul. 20, 2018 (JP) .................................. 2018-137190
Apr. 15, 2019 (JP) .................................. 2019-076918

(51) Int. Cl.
*B21D 51/38* (2006.01)
*B21D 51/44* (2006.01)
(Continued)

(52) U.S. Cl.
CPC ......... *B21D 51/383* (2013.01); *B21D 51/443* (2013.01); *B32B 7/12* (2013.01);
(Continued)

(58) Field of Classification Search
CPC .... B21D 51/38; B21D 51/383; B21D 51/443; B32B 15/09; B32B 2439/66; B65D 7/12;
(Continued)

(56) References Cited

U.S. PATENT DOCUMENTS 4,045,431 A * 8/1977 Fagerburg .............. C08G 63/46
428/458
4,397,401 A   8/1983 Ueno et al.
(Continued)

FOREIGN PATENT DOCUMENTS

CN   102089215 B   6/2013
CN   105377944 A   3/2016
(Continued)

OTHER PUBLICATIONS

Chinese official action dated Apr. 28, 2022 (and English transation thereof) in corresponding Chinese Patent Application No. 2019800487009.

(Continued)

*Primary Examiner* — Michael C Romanowski
(74) *Attorney, Agent, or Firm* — John P. White

(57) ABSTRACT

A can lid comprising: a main body comprising a laminate metal sheet, the laminate metal sheet comprising a metal sheet and a first resin film on a major surface of the metal sheet, the major surface having a score line delimiting an opening piece, the first resin film comprising a first resin layer comprising a dimer acid-copolymerized polyester resin and being amorphous; and a tab attached to the main body and adapted to cause a cleavage along the score line.

10 Claims, 5 Drawing Sheets

(51) Int. Cl.
  *B32B 7/12* (2006.01)
  *B32B 15/09* (2006.01)
  *B32B 15/18* (2006.01)
  *B32B 27/36* (2006.01)
  *B65D 17/28* (2006.01)
  *B65D 17/347* (2006.01)

(52) U.S. Cl.
  CPC .............. *B32B 15/09* (2013.01); *B32B 15/18* (2013.01); *B65D 17/347* (2018.01); *B65D 17/4011* (2018.01); *B65D 17/404* (2018.01); *B32B 2255/26* (2013.01); *B32B 2435/02* (2013.01); *B65D 2517/0016* (2013.01); *B65D 2517/5075* (2013.01); *Y10T 428/1355* (2015.01)

(58) Field of Classification Search
  CPC ... B65D 17/347; B65D 17/353; B65D 17/401
  USPC .............................................. 428/34.1–36.92
  See application file for complete search history.

(56) References Cited

U.S. PATENT DOCUMENTS

| | | | |
|---|---|---|---|
| 4,762,245 A * | 8/1988 | Matsubayashi .... | B65D 17/4011 220/269 |
| 5,753,377 A * | 5/1998 | Takahashi ............... | B32B 27/36 528/307 |
| 6,277,455 B1 * | 8/2001 | Shimizu ................. | B32B 15/08 428/35.8 |
| 6,427,860 B1 | 8/2002 | Nishida et al. | |
| 11,739,182 B2 * | 8/2023 | Hirose ............... | G11B 5/73927 428/831 |
| 2006/0228524 A1 * | 10/2006 | Kubo ...................... | B32B 15/09 428/458 |
| 2007/0218226 A1 * | 9/2007 | Tadaki ................... | B32B 15/09 428/34.7 |
| 2009/0011162 A1 * | 1/2009 | Ohashi ................... | B32B 15/20 428/458 |
| 2009/0123756 A1 * | 5/2009 | Hashimoto ............. | B32B 21/08 428/480 |
| 2009/0206096 A1 * | 8/2009 | Hirotsu ............. | H01M 50/1243 72/347 |
| 2010/0021749 A1 * | 1/2010 | Funagi ................. | C09D 167/02 428/458 |
| 2012/0318699 A1 * | 12/2012 | Parekh ................... | C08L 33/00 206/524.3 |
| 2014/0076768 A1 * | 3/2014 | Skillman ............... | B32B 15/095 524/559 |
| 2014/0170348 A1 * | 6/2014 | Yamazaki ............... | C23C 26/00 428/35.8 |
| 2014/0178616 A1 * | 6/2014 | Richman ............ | C08G 18/4233 72/46 |
| 2015/0258599 A1 | 9/2015 | Friedrich et al. | |
| 2016/0186005 A1 * | 6/2016 | Kimiduka .............. | B65D 25/34 428/35.8 |
| 2017/0225830 A1 * | 8/2017 | Kashiwakura ..... | B65D 17/4012 |
| 2017/0266924 A1 * | 9/2017 | Nakamura ............. | B32B 15/20 |
| 2018/0362210 A1 | 12/2018 | Vanderstraeten | |
| 2019/0092543 A1 * | 3/2019 | Mori ...................... | B32B 15/09 |
| 2020/0391481 A1 * | 12/2020 | Wang .................. | B32B 38/0012 |

FOREIGN PATENT DOCUMENTS

| | | | | |
|---|---|---|---|---|
| EP | 0 928 684 | B1 | | 6/2004 |
| EP | 0905191 | B1 * | 10/2012 | ............. C08L 67/02 |
| JP | 9-150492 | A | | 6/1997 |
| JP | 2000-318733 | A | | 11/2000 |
| JP | 2001347605 | A * | 12/2001 | |
| JP | 3303999 | B2 | | 5/2002 |
| JP | 2002-193256 | A | | 7/2002 |
| JP | 2004-074749 | A | | 3/2004 |
| JP | 2006282195 | A * | 10/2006 | |
| JP | 2013-147547 | A | | 8/2013 |
| JP | 2013188946 | A * | 9/2013 | |
| JP | 2013-249138 | A | | 12/2013 |
| JP | 2014-101143 | A | | 6/2014 |
| WO | WO 2004/103836 | A1 | | 12/2004 |
| WO | WO 2008/117694 | A1 | | 10/2008 |
| WO | WO 2015/001679 | A1 | | 1/2015 |
| WO | WO 2016/056509 | A1 | | 4/2016 |
| WO | WO 2016/093219 | A1 | | 6/2016 |
| WO | WO 2017/032752 | A1 | | 3/2017 |
| WO | WO 2020/017466 | A1 | | 1/2020 |

OTHER PUBLICATIONS

European search report dated Apr. 4, 2022 in corresponding European Patent Application No. 19837564.4.
Taiwanese official action dated Feb. 7, 2023 in corresponding Taiwan Patent Application No. 108125551.
Written Opinion of the International Searching Authority issued Aug. 27, 2019 in connection with PCT International Application No. PCT/JP2019/027757.
International Search Report issued Aug. 27, 2019 in connection with PCT International Patent Application No. PCT/JP2019/027757.
Japanese official action (and English transation thereof) dated Nov. 29, 2022 in corresponding Japanese Patent Application No. 2020-531299.

* cited by examiner

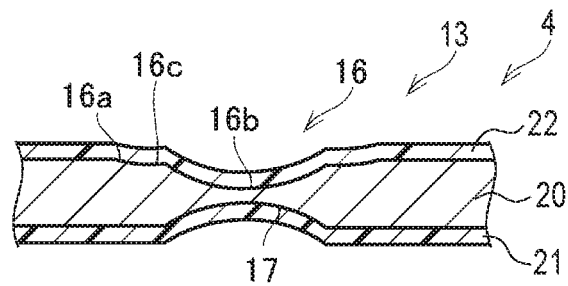
F I G. 6
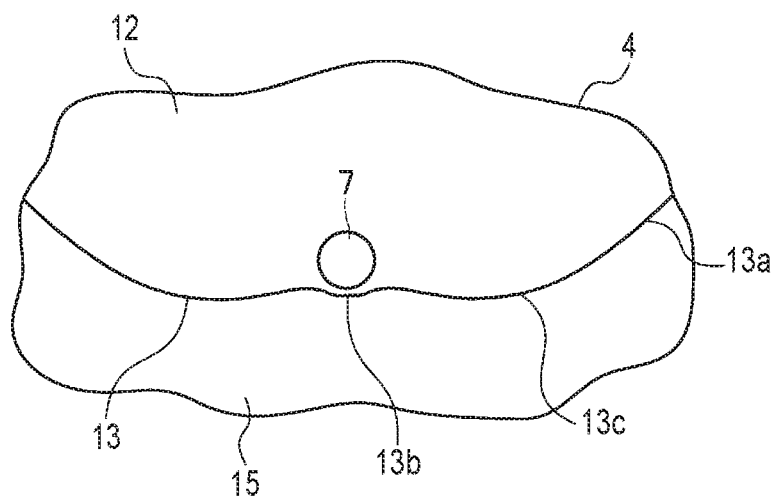
F I G. 7

CAN LID

CROSS-REFERENCE TO RELATED APPLICATIONS

This application is a Continuation Application of PCT Application No. PCT/JP2019/027757 filed Jul. 12, 2019 and based upon and claiming the benefit of priority from Japanese Patent Applications No. 2018-137190 filed Jul. 20, 2018 and No. 2019-076918 filed Apr. 15, 2019, the entire contents of which are incorporated herein by reference.

BACKGROUND OF THE INVENTION

1. Field of the Invention

The present invention relates to a can lid.

2. Description of the Related Art

A can lid known as an easy-open can lid, designed so that the tab attached to its main body, when pulled, causes a cleavage along a score line to make an opening, has become popular. The easy-open can lid is roughly categorized into a partial-open type that opens over part of the lid and is used for a beverage can, or a full-open type that opens along the entire circumference of the lid and is used for a food can. Also, the partial-open type can lid is roughly categorized into a pull tab type that allows for the tab to be pulled and thus separated along with an opening piece from the lid main body, or a stay-on tab type that opens upon a tab pulling action to cause an opening piece to push inward.

A material adopted for forming a can lid is a resin-coated metal sheet constituted by a metal sheet such as an aluminum alloy sheet or a steel sheet covered with a resin for anti-corrosion purposes. The problem, however, with a can lid formed of such a resin-coated metal sheet is that the resin coating could be damaged during a process of adding a score line, which increases the likelihood of corrosion. Moreover, a can lid formed of a resin-coated metal sheet requires the resin coating and the metal sheet to be torn off altogether at the time of the cleavage along the score line.

CITATION LIST

Patent Literature

[Patent Document 1] Jpn. Pat. Appln. KOKAI Publication No. 2000-318733

BRIEF SUMMARY OF THE INVENTION

The present invention intends to provide, as one object, a can lid that can avoid damage to its resin films during the formation of a score line, and that allows for easy tearing of the resin films at the cleavage along the score line.

According to the present invention, there is provided a can lid comprising:
 a main body comprising a laminate metal sheet, the laminate metal sheet comprising a metal sheet and a first resin film on a major surface of the metal sheet, the major surface having a score line delimiting an opening piece, the first resin film comprising a first resin layer comprising a dimer acid-copolymerized polyester resin and being amorphous; and
 a tab attached to the main body and adapted to cause a cleavage along the score line.

According to the present invention, it is possible to provide a can lid that can avoid damage to the resin films during the formation of a score line, and that allows for easy tearing of the resin films at the cleavage along the score line.

BRIEF DESCRIPTION OF THE SEVERAL VIEWS OF THE DRAWING

FIG. 6 is an enlarged cross section of the structure of a score line of the can lid, for explaining the shape of the score line.

FIG. 7 is a partial view for explaining how the score line is shaped at a location near a rivet.

DETAILED DESCRIPTION OF THE INVENTION

A can lid according to an embodiment of the present invention is assumed to be a so-called full-open type can lid. The can lid includes a main body and a tab, and the main body is attachable to the body of a can. The main body is clamped to the can body by being rolled up into it. The center of the main body is a panel portion. In the main body, a score line gives a demarcation so that an opening piece that occupies most of the panel portion is formed. The tab is riveted to a part of the periphery of this opening piece. The tab includes a finger hook. Pulling up this finger hook causes an initial break at a part of the score line, leading to a cleavage along the score line which gradually progresses from the part where the initial break has occurred, and ultimately covers the entire score line to remove the opening piece from the main body and make an opening in the can lid.

Hereinafter, the structure of a can lid 1 according to an embodiment of the present invention will be described with reference to FIGS. 1 to 8. One embodiment for the can lid will be described first, and then the composition of a resin film that constitutes the can lid will be described in detail. The description is intended to illustrate, but not limit, the present invention.

1. Embodiment for Can Lid

Figure 1:
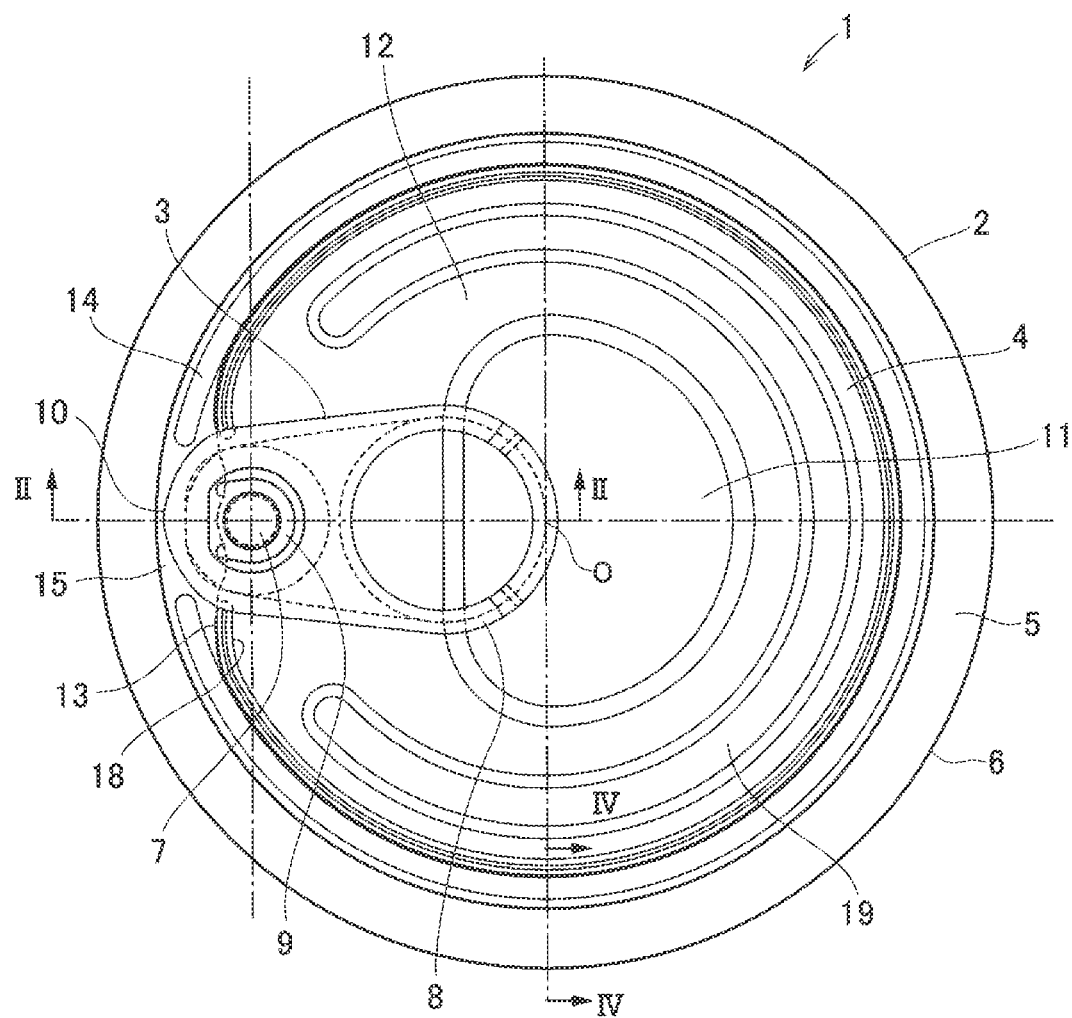
FIG. 1 is a front view of an exemplary can lid according to the present invention which shows its basic structure.
Figure 2:
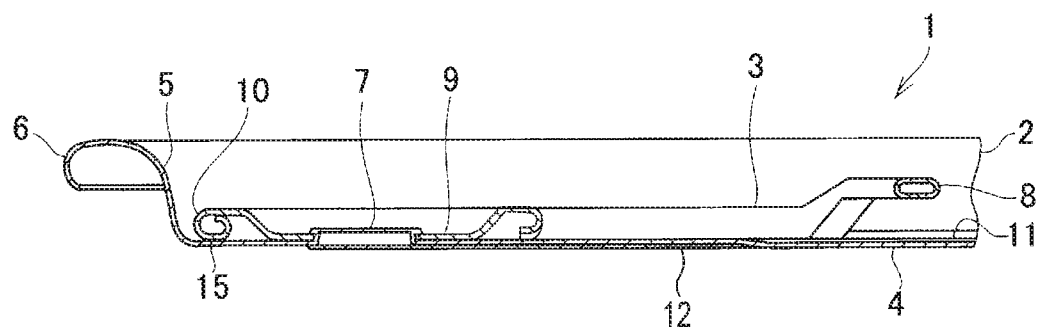
FIG. 2 is a cross section of the structure of the can lid taken along the line II-II given in FIG. 1.

The can lid 1 according to the embodiment of the present invention includes a main body 2 and a tab. One example of the can lid 1 is shown in FIGS. 1 and 2. The main body 2 is a component having a disc shape that accords with the shape of the can body (not shown in the drawings). The main body 2 is made of a laminate metal sheet having resin films laminated on the respective, front and back surfaces of a metal sheet such as an aluminum alloy sheet or a steel sheet. Preferably, the metal sheet is a steel sheet. Use of a steel sheet is advantageous from the viewpoint of cost and recycling. It is preferable to employ, as the steel sheet, a surface-treated steel sheet made of tin-free steel, low-tin steel, or the like.

Figure 3:
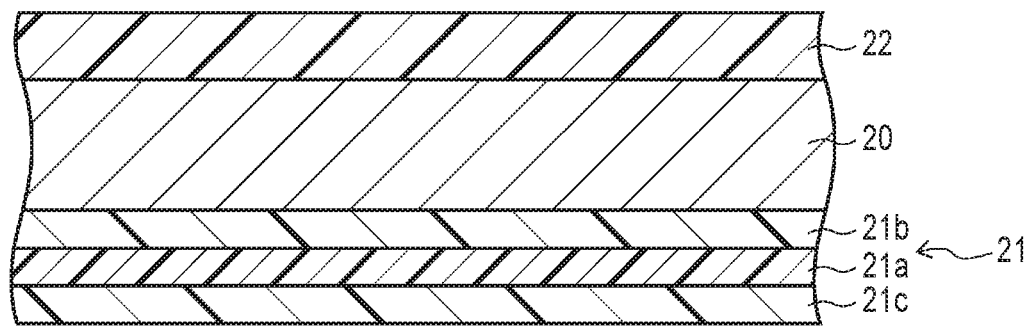
FIG. 3 is a cross section of a laminate metal sheet used for the can lid which shows its layer structure.

FIG. 3 shows a layer structure of the laminate metal sheet. The layer structure of the laminate metal sheet shown in FIG. 3 is constituted by a metal sheet 20, a first resin film 21 laminated on one major surface of the metal sheet 20, i.e., the inner surface of the can lid 1, and a second resin film 22 laminated on the other major surface of the metal sheet 20, i.e., the outer surface of the can lid 1.

The second resin film 22 laminated on the outer surface of the can lid 1 may be a resin film consisting mainly of a polybutylene terephthalate resin (that is, at a content of 50 mass % or more). Use of such a resin film can maintain the appearance of a can lid or a can container in good condition by preventing the occurrence of partial whitening, etc. due to crystallization during the retort sterilization treatment of cans. A preferable form of the second resin film 22 may be a resin film consisting mainly of a polybutylene terephthalate resin (that is, at a content of 50 mass % or more, preferably 60 to 90 mass %) and further containing a polyethylene terephthalate resin. The second resin film 22 has a thickness of, for example, 8 to 20 µm.

The first resin film 21 laminated on the inner surface of the can lid 1 is a laminate film having a three-layered structure. As shown in the figure, this three-layered laminate film is constituted by an inner layer 21b, an intermediate layer 21a, and an outer layer 21c. More specifically, the inner layer 21b may be a resin film consisting mainly of (i.e., containing 50 mass % or more of) an isophthalic acid-copolymerized polyester resin that contains 3 to 15 mol % of isophthalic acid with respect to the total acid content in the inner layer 21b. The intermediate layer 21a may be a resin film consisting mainly of (i.e., containing 50 mass % or more of) a dimer acid-copolymerized polyester resin that contains 5 to 50 mol % of dimer acid with respect to the total acid content in the intermediate layer 21a. The outer layer 21c may be a resin film consisting mainly of (i.e., containing 50 mass % or more of) an isophthalic acid-copolymerized polyester resin containing 3 to 15 mol % of isophthalic acid with respect to the total acid content in the outer layer 21c. The inner layer 21b, the intermediate layer 21a, and the outer layer 21c each have a thickness of, for example, 3 to 20 µm. It is preferable for the first resin film 21 to have dimer acid ratio of 3 to 30 mol % to the total acid content in the entire film.

This three-layered laminate film can be bonded to the metal sheet 20 through an adhesive. The adhesive may be made of a resin material without a bisphenol-A content. In other words, it is preferable for the adhesive not to contain a bisphenol-A epoxy resin. The bisphenol-A epoxy resin is suspected to be an endocrine disrupter substance. As such, the absence of the bisphenol-A epoxy resin is desirable for reliably avoiding elution of any bisphenol-A epoxy resin into the contents of can containers.

Because of the inclusion of the dimer acid-copolymerized polyester resin, the first resin film 21 of the three-layered laminate film is flexible. Use of this first resin film 21, with its good flexibility, enables the formation of a score line (described later) to proceed while avoiding or suppressing damages to the film. Accordingly, the part where the score line has been formed can be prevented from corroding, even without post-score line repairing work with a coating material. That is, the quality of the inside of the can lid can be guaranteed (see Examples 1 to 4 and Example 6 as will be set forth).

Although the intermediate layer 21a containing the dimer acid-copolymerized polyester resin is sticky at high temperatures and flexible and easily damaged at room temperature, the three-layered laminate film ensures it is sandwiched by the inner layer 21b and the outer layer 21c, each of which contains the isophthalic acid-copolymerized polyester resin. Thus, improved usability for the first resin film 21 can be realized. Put another way, the inner layer 21b and the outer layer 21c do not become sticky even at high temperatures and are relatively robust at room temperature. They will therefore neither cause a problem by winding around a high-temperature stretching roll during film formation, nor become damaged at the time of conveyance during can lid formation. Besides, problems such as winding around a stretching roll and damage at the conveyance of can lids are often solvable by special measures such as subjecting the component located at the source of trouble to a surface treatment, or by other measures such as reduction of production speed. In these cases, the inner layer 21b and the outer layer 21c may be omitted according to the technical measures in production (see Examples 2 to 4 below).

The first resin film 21 and the second resin film 22 are laminated on the metal sheet 20 and then converted to an amorphous state by a heat treatment. The first resin film 21 and the second resin film 22, being amorphous members, can eliminate the difficulty of tearing as well as directional variations in the form of tearing, which could otherwise be incurred at the time of the cleavage along the score line if the films are of oriented crystals. As such, easy-to-tear films can be realized (see Examples 1 to 4 and also Example 5 below).

The resin films constituting the can lid 1, namely, the first resin film 21 and the second resin film 22, will be described in more detail later.

As described above, it is preferable for the layer structure of the laminate metal sheet shown in FIG. 3 that the first resin film 21 be an inner-surface side film of the can lid 1, and the second resin film 22 be an outer-surface side film of the can lid 1. Nevertheless, in the instance where the conditions of the retort sterilization treatment for cans adopt relatively low temperatures while involving only slight whitening unharmful to product values, the first resin film 21 containing the dimer acid-copolymerized polyester resin may be provided on the outer side of the can lid 1 in the layer structure of the laminate metal sheet as shown in FIG. 3.

The main body 2 of the can lid 1 is prepared through pressure molding of a blank which is made of a metal sheet of the type discussed above. As shown in FIGS. 1 and 2, the main body 2 includes a panel portion 4, a chuck wall 5, a flange 6, and a rivet 7. The panel portion 4 is of a disk shape. The chuck wall 5 for the attachment to the can body is formed in the peripheral edge of the disk-shaped panel portion 4 as shown in FIGS. 1 and 2. This chuck wall 5 has an end portion that constitutes the flange 6 to be rolled and clamped. The rivet 7 is formed at a predetermined position near the peripheral edge of the panel portion 4. The rivet 7 is a part of the panel portion 4 that is made to protrude toward the outside, and the tab 3 is attached to the panel portion 4 via this rivet 7. The "outside" here corresponds to the upper side of FIG. 2. The rivet 7 is displaced from the center O of the can lid 1. In one concrete example, the rivet 7 is provided on the peripheral edge side of the panel portion 4.

The tab 3 is a portion serving as a handle for an opening action. The tab 3 is prepared separately from the main body 2 and attached to the panel portion 4 via the rivet 7. The material to form the tab 3 is, for example, a steel sheet or an aluminum alloy sheet. The tab 3 is prepared through, for example, pressure molding. The tab 3 includes a finger hook 8, an attachment portion 9 attached by the rivet 7, and an edge-side nose 10 that acts as a fulcrum in leverage. The finger hook 8, the attachment portion 9, and the nose 10 are arranged in this order along a straight line. As such, the tab 3 is of an elongated shape. The periphery of the tab 3 is given a two-layered structure or a curled structure by being folded downward so that the tab 3 is endowed with a predetermined bending rigidity.

The finger hook 8 is positioned on the side of the center O of the can lid 1 when the tab 3 is attached by the rivet 7. The finger hook 8 is formed into a ring shape. Among this ring shape, a portion located on the side of the center O is pressed into a reduced thickness so that the portion floats above the surface of the panel portion 4. Also, a space is provided below this thinned portion for smooth insertion of a fingertip. That is, a predetermined range of the panel portion 4, including the part facing the thinned portion, is recessed inward (to the lower side) to form a finger hook recess 11. In other words, the finger hook 8 is spaced apart from the panel portion 4 in the state where the tab 3 is attached by the rivet 7. The finger hook recess 11 is provided in the area of the panel portion 4 that includes the part facing the finger hook 8 in the state where the tab 3 is attached by the rivet 7. The finger hook recess 11 is formed such that it is dented from the other part of the panel portion 4. Accordingly, there is a gap between the finger hook 8 and the finger hook recess 11 for allowing a fingertip to easily catch the tab 3.

The attachment portion 9 is a lip-like portion which is fixed to the panel portion 4 by having the rivet 7 penetrate it and flattening out the tip, i.e., the head, of the rivet 7. In other words, the attachment portion 9 is a tongue-shaped portion located on the side of the nose 10. The attachment portion 9 thus extends from the side of the nose 10 to the side of the finger hook 8. The attachment portion 9 has an opening for the placement of the rivet 7. Part of the attachment portion 9 around the opening contacts the rivet 7 when the rivet 7 is flattened out. The attachment portion 9 is formed by making, in the tab 3, an arc slit that centers on the rivet 7. As such, the attachment portion 9 is separated from the part on the side of the finger hook 8. Accordingly, when the lifting of the finger hook 8 commences, the attachment portion 9 and the rivet 7 are left on the side of the panel portion 4 while permitting the finger hook 8 to be lifted, thus better enabling easy hooking of the finger hook 8 in cooperation with the aforementioned finger hook recess 11.

The nose 10 faces the outermost periphery of the panel portion 4. In other words, the nose 10 is located slightly inside the aforementioned chuck wall 5. Note that if there is an annular groove between the chuck wall 5 and the panel portion 4, the nose 10 is located slightly inside (on the circumferentially inner side of) the annular groove.

The tab 3 is attached to the panel portion 4 such that it is in close contact with the flat top (surface) of the panel portion 4. In that state, the nose 10 closely contacts the top of the panel portion 4, while part of the finger hook 8, which is on the side of the center O, comes above the finger hook recess 11 with a predetermined gap from the top (surface) of the finger hook recess 11.

Figure 4:
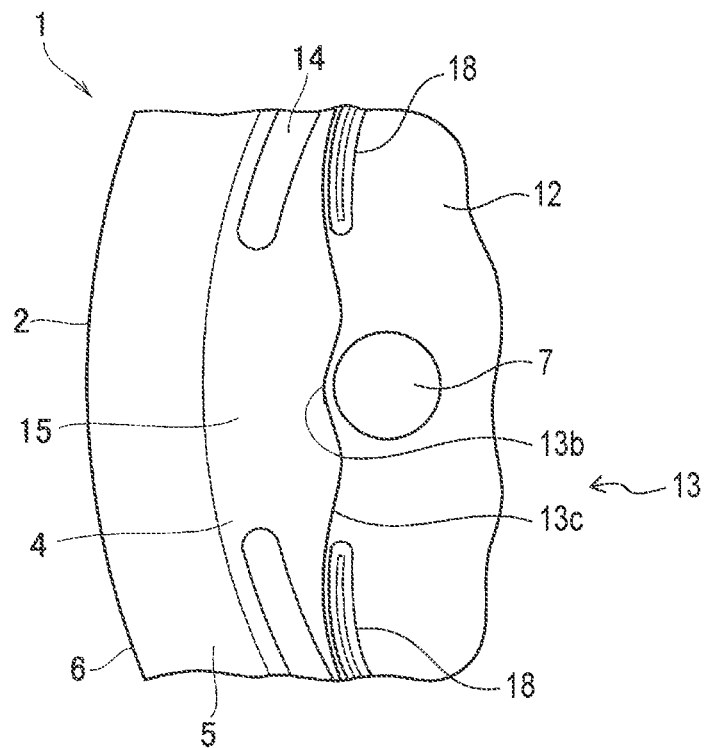
FIG. 4 is a plan view showing a part of the structure of a main body of the can lid, for explaining the shapes around a support portion of the can lid.
Figure 5:
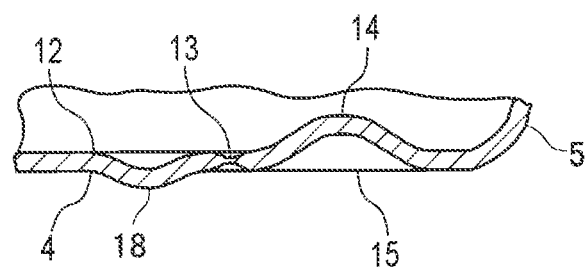
FIG. 5 is an enlarged cross section of the structure of the can lid taken along the line IV-IV given in FIG. 1.

Most of the panel portion 4 constitutes an opening piece 12 to be removed from the can lid 1. A score line 13 providing a demarcation for the formation of the opening piece 12 is provided on the outer periphery of the panel portion 4. As shown in FIGS. 1 and 4, the score line 13 is formed inside a bead 14 formed in the outermost periphery of the panel portion 4 (the bead 14 will be provisionally called an outer peripheral bead). The outer peripheral bead 14 is for increasing the bending rigidity of the portion adjacent to the outside of the score line 13 (this portion will be provisionally called a residual ring portion). The outer peripheral bead 14 is of a convex bead profile that protrudes upward from the panel portion 4 as shown in FIG. 5, which is a cross section including the same.

The outer peripheral bead 14 is, as shown in FIG. 1, formed in an arc shape over the entire periphery of the panel portion 4, except in the vicinity of the part that is in contact with the nose 10 of the tab 3. In other words, the outer peripheral bead 14 is disconnected in the vicinity of, among the outer periphery (residual ring portion) of the panel portion 4, the part in contact with the nose 10. Accordingly, the portion where the outer peripheral bead 14 is not continuous, that is, the portion between the ends of the disconnected outer peripheral bead 14, serves as a support portion 15. The support portion 15 here is a portion for supporting the nose 10 in such a manner that the nose 10, as a fulcrum, can realize the effect of a class 2 lever when the leverage with the tab 3 is initiated. The support portion 15 is between the ends of the outer peripheral bead 14 as described above, and, as such, the ends of the outer peripheral bead 14 are located on the respective sides of the support portion 15 in the circumferential direction. The bending rigidity of the support portion 15 is increased by the outer peripheral bead 14 so that deformation in the thickness direction will be prevented. Note that the outer peripheral bead 14 may be formed up to the point below the nose 10. That is, the outer peripheral bead 14 may extend to a region that faces the nose 10. In that case, adding modifications or changes such as thinning the nose 10 would be preferable in order to keep the nose 10 from being pushed up by the outer peripheral bead 14. Also, when the main purpose of providing the outer peripheral bead 14 is to enhance the rigidity of the support portion 15, the outer peripheral bead 14 may be provided only on both sides of the support portion 15, while being omitted from the part of the outer periphery of the panel portion 4 on the side opposite to the support portion 15 with respect to the center O.

The score line 13 is a line portion formed with a small thickness so as to easily cause a cleavage or tearing according to the operation of the tab 3. The thickness here means the thickness of the panel portion 4 where the score line 13 is provided, namely, the thickness of the part left after formation of the score line 13. The score line 13, as shown in FIG. 6 as an example, is constituted by an outer score line 16 formed on the front face of the panel portion 4 and an inner score line 17 formed on the back face of the panel portion 4. The thickness of the thinnest part between the outer score line 16 and the inner score line 17 is referred to as a score residual thickness.

One of the outer score line 16 and the inner score line 17 (the outer score line 16 in the illustrated example) is constituted by two stepwise grooves. The first groove 16a is wider and shallower than the second groove 16b and has an arc-shaped cross section. The second groove 16b is formed in the central part of the first groove 16a in the width direction of the first groove 16a. The first groove 16a has a bottom having, for example, a flat surface. The second groove 16b is a deep groove narrower than the first groove 16a and having an arc-shaped cross section. Note that the depth of the second groove 16b corresponds to the measure from the top of the panel portion 4 to the bottom of the second groove 16b. Thus, the measure from the bottom of the first groove 16a to the bottom of the second groove 16b may be the same as, or smaller than, the depth of the first groove 16*a*. The opening width of the second groove 16*b* at the bottom of the first groove 16*a* is narrower than the bottom width of the first groove 16*a*, and as such, a flat portion 16*c* is present between the first groove 16*a* and the second groove 16*b*. This flat portion 16*c* is a planar area that is parallel to the top or the back face of the panel portion 4.

The inner score line 17 is a groove having an arc-shaped vertical cross section and formed such that its center in the width direction coincides with the center of the outer score line 16 in the width direction. The arc of the inner score line 17 has a curvature radius larger than that of the arc of the second groove 16*b*. The width of the inner score line 17 is smaller than that of the first groove 16*a* and larger than that of the second groove 16*b*. The depth of the inner score line 17 is about the same as that of the second groove 16*b*. The sum of the depths of the inner score line 17 and the second groove 16*b* is smaller than the thickness of the panel portion 4, and therefore, the score residual thickness equals the measure obtained by subtracting the sum of the depths of the inner score line 17 and the second groove 16*b* from the thickness of the panel portion 4. Accordingly, in the examples described herein, the part corresponding to the score residual thickness is set in the middle of the panel portion 4 in the thickness direction of the panel portion 4.

As a result of prescribing the width of the first groove 16*a*, the width of the second groove 16*b*, and the width of the inner score line 17 in the size relationship as discussed above, the flat portion 16*c* partially faces the flat area of the back face of the panel portion 4. In other words, they overlap in the thickness direction of the panel portion 4. This allows the part corresponding to the score residual thickness to be set stably in the middle of the panel portion 4 in the thickness direction, when forming the outer score line 16 and the inner score line 17 at once, by sandwiching and pressing the panel portion 4 with upper and lower dies. More specifically, when the die for forming the outer score line 16 is pressed against the panel portion 4 to cause the section for forming the first groove 16*a* and the section for forming the second groove 16*b* to push into the panel portion 4 by a predetermined dimension, the part to constitute the flat portion 16*c* is sandwiched between the die for forming the outer score line 16 and the die for forming the inner score line 17. In this state, each die is subject to an increased resistive force, and the line formation does not proceed any further. Therefore, events such as the formation of an outer score line 16 deeper than the predetermined depth, or accordingly an inner score line 17 shallower than the predetermined depth, can be avoided. That is, it is possible to avoid, for example, a situation whereby the part corresponding to the score residual thickness is displaced upward or downward in the panel portion 4.

The cross-sectional shapes of the outer score line 16 and the inner score line 17 will be further described. The cross sections of the first groove 16*a* and the second groove 16*b* are each of an arc shape except for the flat portion 16*c*. Similarly, the cross section of the inner score line 17 is of a gentle arc shape. As such, the dies for forming these score lines 16 and 17 do not include sharp edges. In the examples described herein, the can lid 1 is formed of the metal sheet covered with a resin film, and therefore, adopting smooth arc-shaped cross section for the score lines 16 and 17 can prevent or reduce damage to the resin film during formation of the score lines 16 and 17. In other words, the need for repair work with a coating material is obviated.

To provide the largest possible opening area in the can lid 1, the score line 13 is formed along and circumferentially inside the outer peripheral bead 14. More concretely, the score line 13 is formed along the outer peripheral bead 14, and in an arc shape centered on the center O of the panel portion 4, except in the vicinity of the rivet 7. Among the score line 13, such a portion provided along the outer peripheral bead 14 will be provisionally referred to as a main portion 13*a*. Meanwhile, in the vicinity of the rivet 7, the score line 13 is formed in a shape that is approximated to the rivet 7 and curved along the outer periphery of the rivet 7. This portion will be provisionally referred to as a rivet-approximated portion 13*b*. As shown in FIGS. 1 and 7, the rivet-approximated portion 13*b* is formed in the place between the rivet 7 and the above-described support portion 15 and close to the rivet 7. As such, the rivet-approximated portion 13*b* has an arc shape that is along the outer periphery of the rivet 7 and that is convex toward the support portion 15 from the side of the rivet 7.

Between the rivet-approximated portion 13*b* and the main portion 13*a* is a connecting portion 13*c* which is gently curved in directions according to the outer face (surface) of the panel portion 4. This connecting portion 13*c* is a score line that points in the same direction as a line that is orthogonal to the straight line connecting the center O of the can lid 1 and the center of the rivet 7. The connecting portion 13*c* is not a linear but gently curved score line as seen in the plan view of the can lid 1. For example, since the rivet-approximated portion 13*b* is formed along the outer periphery of the rivet 7, this curved shape of the connecting portion 13*c* is, as shown in FIG. 7, convex toward the center O of the can lid 1 in the vicinity of the rivet-approximated portion 13*b* and convex toward the support portion 15 when running to the main portion 13*a*. Such a curved shape has been adopted in order to improve the lid openability by letting the cleavage (tearing) along the score line 13 smoothly and continuously occur, to provide a largest possible opening area by reducing the area of the residual ring portion, and further, to suppress the degradation in strength.

A bead 18 (provisionally referred to as an inner peripheral bead) is formed circumferentially inside the score line 13 and along the score line 13. The inner peripheral bead 18 is for increasing the bending rigidity of the portion adjacent to the inside of the score line 13, and is of a concave bead profile recessed downward from the panel portion 4 as shown in FIG. 5, which is a cross section including the same. Here, the portion adjacent to the inside of the score line 13 means the periphery of the opening piece 12. While the score line 13 is of a closed annular shape, the inner peripheral bead 18 is of a shape having an open part. That is, the inner peripheral bead 18 is designed along the main portion 13*a* and a part of the connecting portion 13*c* of the score line 13, while having ends at respective sides of the rivet 7. The purpose of this design is to permit stable formation of the rivet 7 and the inner peripheral bead 18 into desired shapes without causing interference therebetween, and also to increase the bending rigidity of the portion of the opening piece 12 near the rivet 7. Thus, as long as this purpose is met, the space between the ends of the inner peripheral bead 18 may be provided. Additionally, the width and depth of the inner peripheral bead 18 may be smaller than the width and depth of the outer peripheral bead 14 as shown in FIG. 1, but this is not a limitation. The beads 14 and 18 may have the same width and depth.

In FIG. 1, reference numeral 19 denotes a reinforcing recess. The reinforcing recess 19 is a portion for increasing the bending rigidity of the opening piece 12. The reinforcing recess 19 is formed as a wide groove in the opening piece 12. It shows a "C" shape that centers on the center O of the can lid 1, as can be seen from FIG. 1.

The can lid 1 according to an embodiment of the invention is adapted to be rolled and clamped to the can body (not illustrated) through the flange 6. Here, a good clamping effect can be obtained by turning the outer resin film and the inner resin film into an amorphous state. This is due to each film improving the elongation characteristics so that good followability to the flange 6 deformation (rolled for clamping) can be obtained. To open the can lid 1 for removing its contents, a fingertip is placed on the above-described finger hook 8 of the tab 3 to raise the finger hook 8. At this time, since there is a space below the finger hook 8 due to the presence of the above-described finger hook recess 11 in the panel portion 4, the fingertip can be easily inserted below the finger hook 8 for hooking.

Upon applying force in a manner to pull and raise the finger hook 8, the tab 3 is obliquely raised with the edge-side nose 10 acting as a fulcrum. Here, since the attachment portion 9, which is fixed to the rivet 7, is separated from the part on the side of the finger hook 8 by the slit delimiting the attachment portion 9, the tab 3 raises obliquely while leaving the attachment portion 9 in close contact with the panel portion 4 (opening piece 12). Accordingly, at the outset of raising the finger hook 8, no particular plucking of the rivet 7 is involved, and only a small force is required for raising the finger hook 8. Also, when the finger hook 8 is raised with a small force in this manner, the space between the finger hook 8 and the panel portion 4, or more concretely, the space between the finger hook 8 and the opening piece 12 becomes large, and the fingertip can therefore further advance below the finger hook 8 and reliably hook itself onto the finger hook 8.

In this pulling and raising of the tab 3, the nose 10 serves as a fulcrum as described above. The support portion 15, in contact with the nose 10, is the part of the outer periphery of the panel portion 4 that is between the ends of the outer peripheral bead 14 as described above. Thus, the support portion 15, even in the absence of the outer peripheral bead 14 itself, has a high bending rigidity as it is reinforced by the outer peripheral bead 14 located on both sides thereof. Accordingly, the nose 10 is securely supported by the support portion 15 at the time of raising the finger hook 8, ensuring the raising of the tab 3. In other words, it is possible to avoid or prevent absorption of the force for raising the tab 3 by the deformation or the like of the support portion 15, or insufficient raising of the tab 3.

When the finger hook 8 is pulled up further, the ascending amount of the part near the attachment portion 9 exceeds the tolerable deformation amount of the attachment portion 9. Here, the ascending amount of the part near the attachment portion 9 means the lift-up amount of the part near the attachment portion 9 with reference to the state before the raising of the tab 3. The tolerable deformation amount refers to an amount of deformation that does not cause a break at the rivet-approximated portion 13b of the score line 13 when the part near the attachment portion 9 is deformed upward around the rivet 7. Thus, upon exceeding the tolerable deformation amount of the attachment portion 9, the tab 3 functions to pull up the rivet 7 via the attachment portion 9.

More specifically, the tab 3 enables the effect of a class 2 lever with the finger hook 8 as an effort point, the nose 10 as a fulcrum, and a portion coupled to the rivet 7, i.e., the attachment portion 9 in the embodiment, as a load point. Even here, the nose 10 is securely supported thanks to the high rigidity of the support portion 15, and therefore, the pulling force can be reliably applied to the attachment portion 9 or the rivet 7 as a load point.

Figure 8:
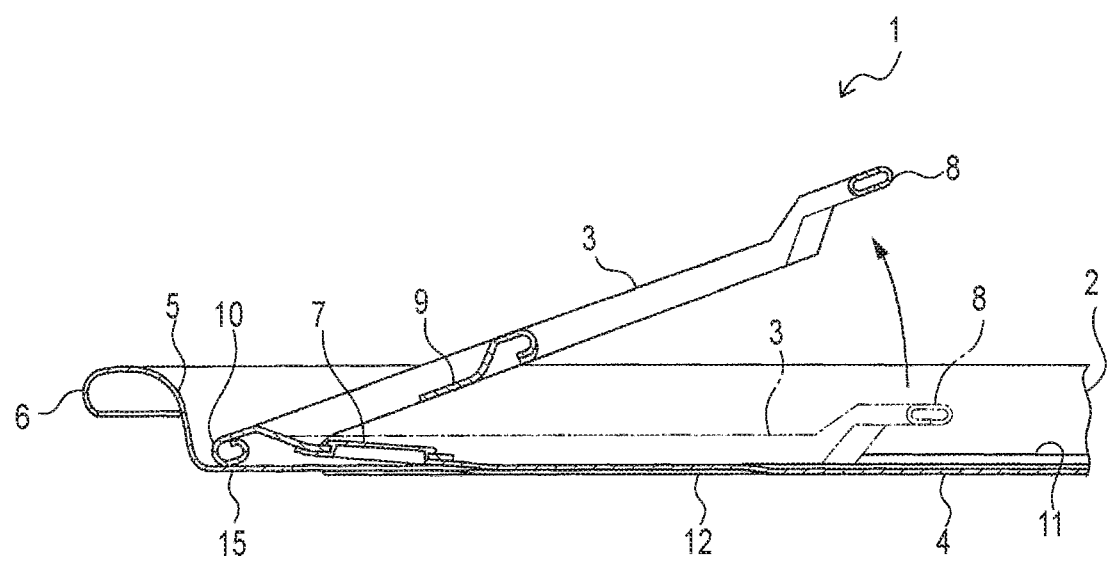
FIG. 8 is a cross section showing a part of the can lid for explaining a state in which an initial break at the score line has occurred.

FIG. 8 schematically shows the state in which the rivet 7 has been pulled in the manner as discussed. According to this state, the pulling force is acting on the part of the panel portion 4 that is around the rivet 7. In response, a break occurs at the rivet-approximated portion 13b due to the pulling force on the panel portion 4, since the rivet-approximated portion 13b is a portion of the score line 13 that is along the rivet 7 and has a thinned thickness. This break is the initial break for the score line 13. Here, the breaking force for causing a break at the rivet-approximated portion 13b stems from the force for pulling and raising the finger hook 8, amplified by the effect of a class 2 lever carried out with the tab 3. Since the rigidity of the support portion 15 serving as a fulcrum in the class 2 lever effect is increased by the outer peripheral bead 14, the support portion 15 is hardly bent, and the opening force (or cover-opening force) from raising the finger hook 8 can be focused on the rivet-approximated portion 13b as the breaking force. Also, among the opening piece 12, the portion around the rivet-approximated portion 13b is close the ends of the inner peripheral bead formed circumferentially inside and along the score line 13, and is thus reinforced by the inner peripheral bead 18. As such, the breaking force from the lifting of the rivet 7 is only minimally absorbed by the bending of the panel portion 4, and focused on the rivet-approximated portion 13b. Therefore, the can lid 1 according to an embodiment of the invention allows for the easy and reliable initial break at the score line 13, and realizes improved openability of the can in this respect.

The rivet 7 is formed on the opening piece 12, and the break at the rivet-approximated portion 13b thus leads to a part of the opening piece 12 being pulled up in the opening direction. In this state, the tab 3 is largely inclined, and the rivet 7 or the opening piece 12 cannot be pulled up any further by the leverage with the tab 3. Accordingly, after this state, the tab 3 requires a pulling-up action in its longitudinal direction (in the obliquely upper right direction in FIG. 8). This action causes the opening piece 12 to be pulled up from, as a start point, the position where the rivet 7 is provided. The cleavage (tearing) along the score line 13 then gradually proceeds from the rivet-approximated portion 13b to the connecting portion 13c. Here, the connecting portion 13c is formed in a curved shape as described above, and is not of a linear shape running in a direction orthogonal to the direction of the pulling force acting on the opening piece 12. Therefore, the cleavage along the connecting portion 13c gradually progresses without immediate tearing, and the opening force need not be so great. In other words, since the cleavage along the score line 13 can be caused gradually and continuously, the opening piece 12 can be smoothly pulled for performing the opening action.

Moreover, the above-described can lid 1 according to the invention includes the beads 14 and 18 formed on the respective outer and inner peripheral sides of the score line 13. This endows the portions on the outer and inner peripheral sides of the score line 13 with an increased bending rigidity. When the opening piece 12 is pulled up in the manner as described above, the score line 13 is applied with a breaking force to cause tearing along it. Here, since the bending rigidity of the portions on both the outer and inner peripheral sides of the score line 13 is high, deformation of these portions is prevented or suppressed. As a result, the breaking force from the pulling-up action for the opening piece 12 is focused on the score line 13, allowing the cleavage along the score line 13 to progress easily and smoothly.

In the course of this process, a bending force acts on the opening piece 12. Yet, the bending rigidity of the opening piece 12 has been increased by the above-described reinforcing recess 19 formed in the opening piece 12. Therefore, excess bending and deformation of the opening piece 12 under the opening force, or the loss of tearing force for the score line 13 resulting therefrom, can be prevented or suppressed.

The cleavage along the score line 13 progresses laterally from the rivet-approximated portion 13b as described above, and finally ends at the midpoint of the score line 13, that is, the point opposite the rivet-approximated portion 13b. At this point where the cleavage ends, the direction of the force causing the cleavage substantially conforms to the direction of the resistive force against the cleavage. That is, the force causing the cleavage becomes a force for tearing off the opening piece 12 from the surrounding portion, i.e., the residual ring portion, rather than being the force for causing the tearing along the score line 13. In the above-described can lid 1 according to the invention, the outer and inner peripheral beads 14 and 18 are formed over substantially the entire circumference of the opening piece 12, and the point where the cleavage along the score line 13 ends is thus also endowed with a high rigidity. Thus, at the very end of the cleavage along the score line 13, that is, at the tearing-off moment, a neat separation occurs at the score line 13. In other words, it becomes possible to avoid or suppress the occurrence of such an event that, when the cleavage along the score line 13 finally finishes, the opening piece 12 or the residual ring portion creates a local stretch which remains as a projection. Accordingly, fingers, etc. will not be cut.

The above-described score line 13 is formed by the outer score line 16 and the inner score line 17. The outer score line 16 is, as described, constituted by the first groove 16a, the second groove 16b, and the flat portion 16c. This allows the so-called score residual thickness to be set to a dimension as designed, and will not displace the part corresponding to the score residual thickness outward or inward. As a result, the cleavage along the score line 13 smoothly occurs with a pulling action for the tab 3 with a constant force, leading to smooth performance of the opening operation, and therefore to improved openability of the can in this respect as well.

Note that, due to the tearing along the score line 13, edges are created in the outer periphery of the opening piece 12 and the inner periphery of the residual ring portion left on the side of the can body. In this relation, the opening piece 12 includes the inner peripheral bead 18 formed along the score line 13, and the residual ring portion includes the outer peripheral bead 14 formed along the score line 13. The inner peripheral bead 18 has an outer periphery that is substantially flush with the created edge of the opening piece 12. Likewise, the outer peripheral bead 14 has an inner periphery that is substantially flush with the created edge of the residual ring portion. As such, when a finger is brought into contact with these edges, it touches not only the edges but also the inner peripheral face or the outer peripheral face of the beads 14 and 18. As a result, each edge is prevented from firmly digging into, then hurting, the finger, and safety can be secured.

When the cleavage is caused along the score line 13 as above, the films on the inner and outer sides of the can lid 1 are torn off altogether. Since the above-described can lid 1 according to the invention adopts the amorphous films, it can eliminate the difficulty of tearing as well as the directional variations in the form of tearing, which could otherwise be incurred due to oriented crystals of the film, thus leading films to be easily torn. Therefore, improved openability of the can is realized in this respect also.

The can lid 1 according to an embodiment of the invention with the foregoing structure allows for easy and smooth opening operations. Accordingly, it enables the production of the can lid 1 using a metal sheet consisting mainly of a steel sheet having a higher rigidity than aluminum or its alloy. This will contribute to the reduction of cost associated with the can lid 1 or a can container employing the same, and realize the can lid 1 that provides excellent raw material recyclability.

The present invention is not limited to the foregoing embodiments. For example, the above embodiments have been described assuming that the can lid 1 is a full-open type can lid that includes the score line 13 formed inside the bead 14 formed in the outermost periphery of the panel portion 4 and that is designed to open in substantially the entire area of the panel portion 4. However, this is not a limitation. In one example, the can lid 1 may instead be a stay-on tab (SOT) type can lid used for a beverage can, etc., and designed to open in a part of the outer periphery of the panel portion 4. When such an SOT type can lid is adopted, the score line 13 may be provided for that part of the panel portion 4 in such a manner as to cover the region opposite the nose 10 of the tab 3.

Also, the above embodiments have been described assuming that the score line 13 has a structure which includes the outer score line 16 being formed on the front face of the panel portion 4 and the inner score line 17 being formed on the back face of the panel portion 4. This, also, is not a limitation. In one example, the structure may include only one of the outer score line 16 or the inner score line 17. Also, when the score line 13 includes the outer score line 16, this outer score line 16 may be formed by one of the first groove 16a or the second groove 16b. That is, the detailed structure of the score line 13 may be determined as appropriate, as long as the formation of the score line 13 on the laminate metal sheet that includes an amorphous resin film containing a dimer acid-copolymerized polyester resin achieves the capability of avoiding damage to the resin films during the score line formation and also the capability of permitting easy tearing of the resin films at the time of the score line cleavage.

Moreover, the above embodiments have a feature of including a structural member for reinforcing the support portion 15 with which the nose 10 to serve as a fulcrum in the class 2 lever carried out with the tab 3 is arranged in contact. One example of such a reinforcing structural member is the outer peripheral bead 14 according to the foregoing embodiments. The present invention is, however, not limited to the concrete form of the embodiments as described above. Accordingly, the outer peripheral bead 14 may be formed below the nose 10, instead of being disconnected at the support portion 15. The outer peripheral bead 14, as long as it is continuous through a portion other than the support portion 15 as described above, can contribute to the continuous and smooth cleavage along the score line 13 and the neat tearing for the opening piece 12 to be separated from the residual ring portion. Nevertheless, the present invention also tolerates the structures where the outer peripheral bead 14 is formed only on the side of the support portion 15, or where it is not continuous. Similarly, the inner peripheral bead 18 may be formed only in the vicinity of the rivet-approximated portion 13b, and need not be continuous.

2. Resin Films

The resin films that constitute the can lid 1 shown in FIG. 1, that is, the first resin film 21 and the second resin film 22 shown in FIG. 3 will be described in detail.

2-1. First Resin Film 21

The first resin film 21 is constituted by the inner layer 21b, the intermediate layer 21a, and the outer layer 21c.

2-1-1. Inner layer 21b

The inner layer 21b may be a resin film containing, at a content of, e.g., 50 to 100 mass %, an isophthalic acid-copolymerized polyester resin that contains 3 to 15 mol % of isophthalic acid with respect to the total acid content in the inner layer 21b. Such a resin film has a property of not being sticky at approximately 130° C.

The isophthalic acid-copolymerized polyester resin includes, for example, a dicarboxylic acid unit containing 85 to 97 mol % of terephthalic acid component and 15 to 3 mol % of an isophthalic acid component, and a diol unit containing 90 mol % or more of an ethylene glycol component. That is, the isophthalic acid-copolymerized polyester resin is, for example, consisting mainly of ethylene terephthalate in which 3 to 15 mol % of the isophthalic acid component has been copolymerized. Copolymerization of the isophthalic acid component can endow the film with flexibility.

The isophthalic acid-copolymerized polyester resin may also contain a dicarboxylic acid unit other than the terephthalic acid component and the isophthalic acid component within a range that does not impair the adequacy of lamination to the metal sheet and the properties of the can lid, for example, within a range of 10 mol % or less. Examples of such a dicarboxylic acid unit include succinic acid, adipic acid, azelaic acid, sebacic acid, 1,4-naphthalene dicarboxylic acid, 4,4'-biphenyl dicarboxylic acid, 1,12-dodecanoic acid, 1,2-cyclohexane dicarboxylic 1,3-cyclohexane dicarboxylic acid, 1,4-cyclohexane dicarboxylic acid, and so on, any one of which may be used independently or two or more of which may be used in combination.

The isophthalic acid-copolymerized polyester resin may contain a diol unit other than the ethylene glycol component within a range of 10 mol % or less. Examples of such a diol unit include aliphatic diols such as diethylene glycol, triethylene glycol, 1,2-propanediol, 1,3-propanediol, 1,4-butanediol, 1,5-pentanediol, 1,6-hexanediol, and neopentyl glycol, alicyclic diols such as 1,4-cyclohexanedimethanol and 1,4-cyclohexanediethanol, and so on, any one of which may be used independently or two or more of which may be used in combination.

The isophthalic acid-copolymerized polyester resin is obtained by inducing an esterification reaction of the above-described dicarboxylic acid component with the above-described diol component by a known method. For example, this method may be a method of using the dicarboxylic acid component that has a methyl group added to its terminal as a starting material, and causing an ester exchange reaction with the diol component through addition of a catalyst, or a method of using the dicarboxylic acid component without a modified terminal as a starting material and causing an esterification reaction directly with the diol component. In another instance, a commercially-available isophthalic acid-copolymerized polyethylene terephthalate resin may be employed, examples of which include IP121B, PIFG8, and PIFG10 (all from Bell Polyester Products, Inc.). While it is not a particular requirement for the isophthalic acid-copolymerized polyester resin to have a specific limiting viscosity, its limiting viscosity is preferably 0.7 to 0.9.

The isophthalic acid-copolymerized polyester resin described above may be used alone in the form of a film, or may be used together with a single, or multiple, polyester resins, e.g., a polyethylene terephthalate resin, a polybutylene terephthalate resin, a polytrimethylene terephthalate resin, etc., which may be blended in a proportion of less than 50 mass % with respect to the isophthalic acid-copolymerized polyester resin.

2-1-2. Intermediate Layer 21a

The intermediate layer 21a may be a resin film containing a dimer acid-copolymerized polyester resin at a content of, for example, 50 to 100 mass %.

The dimer acid-copolymerized polyester resin, for example, includes:

(A) 50 to 93 mass % of an ester oligomer that contains
  (a1) a dicarboxylic acid unit containing 70 mol % or more of a terephthalic acid component and
  (a2) a diol unit containing 70 mol % or more of an ethylene glycol component, and
that has a number-average molecular weight of 700 or less; and (B) 7 to 50 mass % of a polyester polyol that contains
  (b1) a hydrogenated dimer acid unit and
  (b2) a 1,4-butanediol unit, and
that has a number-average molecular weight of 1500 to 3000.

[Ester Oligomer (A)]

In the above dimer acid-copolymerized polyester resin, the dicarboxylic acid unit (a1) contains 70 mol % or more of a terephthalic acid unit. The entirety of the dicarboxylic acid unit may be a terephthalic acid unit. Or, a dicarboxylic acid component other than the terephthalic acid unit may be contained within a range that does not impair the adequacy of lamination to the metal sheet and the properties of the can lid for formation, and within a range of less than 30 mol %. Examples of this dicarboxylic acid component other than the terephthalic acid unit include isophthalic acid, succinic acid, adipic acid, azelaic acid, sebacic acid, 1,4-naphthalene dicarboxylic acid, 4,4'-biphenyl dicarboxylic acid, 1,12-dodecanoic acid, 1,2-cyclohexane dicarboxylic acid, 1,3-cyclohexane dicarboxylic acid, 1,4-cyclohexane dicarboxylic acid, and so on, any one of which may be used independently or two or more of which may be used in combination. Among these, for example, isophthalic acid may be suitably used within a range of about 1 to 30 mol % for improving characteristics in score processing.

In the above dimer acid-copolymerized polyester resin, the diol unit (a2) contains 70 mol % or more of an ethylene glycol unit. The entirety of the diol unit may be an ethylene glycol unit. Or, a diol component other than the ethylene glycol unit may be contained within a range of less than 30 mol %. Examples of the diol component other than the ethylene glycol unit include propylene glycol, butanediol, neopentyl glycol, diethylene glycol, cyclohexane dimethanol, and so on, any one of which may be used independently or two or more of which may be used in combination.

In the dimer acid-copolymerized polyester resin described above, the number-average molecular weight of the ester oligomer (A) is 700 or less, preferably 300 to 700. By conducting copolymerization using the ester oligomer (A) of the number-average molecular weight of 700 or less, a copolymerized polyester resin in which the polyester polyol (B) is randomly bonded within the polymer chains and which has a clear appearance is obtained. The copolymerized polyester resin thus obtained has good compatibility with other resins, and therefore allows for stable film formation without incurring problems such as occurrence of a surging phenomenon (unstable discharge phenomenon) when being subjected to melt-extrusion after blending with other resins.

On the other hand, if an ester oligomer having a number-average molecular weight of more than 700, for example, around 1000 is used instead, the polymerization reaction reaches a termination point in the course of copolymerization with the polyester polyol (B), and as such, cannot produce a high-viscosity copolymerized polyester resin having a limiting viscosity of about 0.7 to 0.9. Also, use of polyester having a number-average molecular weight of more than 5000 can produce a high-molecular copolymerized polyester resin without causing the polymerization stop phenomenon, but the obtained copolymerized polyester resin will be a -(A)-(B)-type block copolymer because of the large molecular weight of the ester (A) unit, and the appearance of the resin will be clouded due to phase separations. Furthermore, since such a block copolymer has poor compatibility with other resins, the problem of a surging phenomenon (unstable discharge phenomenon) occurring at the time of melt-extrusion, and sheet or film formation not being permitted, exists.

The ester oligomer (A) is obtained by inducing an esterification reaction of the dicarboxylic acid component (a1), consisting mainly of terephthalic acid, with the diol component (a2), consisting mainly of ethylene glycol, by a known method. For example, this method may be a method of acquiring the oligomer by using the dicarboxylic acid component (a1) that has a methyl group added to its terminal as a starting material, and causing an ester exchange reaction with the diol component (a2) through addition of a catalyst, or a method of acquiring the oligomer by using the dicarboxylic acid component (a1) without a modified terminal as a starting material and causing an esterification reaction directly with the diol component (a2).

It is preferable in the production of the ester oligomer (A) that, after a predetermined esterification rate is reached at a reaction temperature of, for example, 230 to 250° C., an input of 3 to 10 mass % of diol (ethylene glycol) with respect to the total oligomer obtained is provided to the system so that depolymerization reaction takes place for about 30 minutes to 1 hour, with the internal temperature kept at 230 to 250° C. By carrying out the depolymerization reaction using diol (ethylene glycol) after the esterification reaction, the number-average molecular weight of the ester oligomer (A) can be adjusted to 700 or less. If, on the other hand, the depolymerization reaction is not carried out, the number-average molecular weight of the ester oligomer resulting under the normal conditions will be high and exceed 700. Even in the case of omitting the depolymerization reaction, it is possible to regulate the number-average molecular weight to 700 or less by setting a molar ratio of the diol component with respect to the dicarboxylic acid component to a high range of 1.25 to 1.60; nevertheless, the number-average molecular weight would exceed 700 if the molar ratio of the diol component falls below 1.25.

[Polyester Polyol (B)]

In the above dimer acid-copolymerized polyester resin, the polyester polyol (B) has a dicarboxylic acid unit constituted by the hydrogenated dimer acid unit (b1). The dimer acid refers to, for example, a dicarboxylic acid compound having 36 carbon atoms obtained by dimerizing an unsaturated fatty acid having 18 carbon atoms such as oleic acid or linoleic acid. The hydrogenated dimer acid refers to a dimer acid in which unsaturated double bonds that remain after the dimerization have been saturated through hydrogenation, and the dicarboxylic acid unit of the polyester polyol (B) is constituted by such a hydrogenated dimer acid unit (b1). Note that the hydrogenated dimer acid is normally obtained as a mixture of compounds of a linear structure, compounds of a branched structure, compounds of an alicyclic structure, etc., and the ratio of their contents varies depending on the production processes. However, the content ratio in the context of the present invention is not particularly limited. The polyester polyol (B) also has a diol unit constituted by the 1,4-butanediol unit (b2). Here, the terminals of the polyester polyol (B) are all hydroxyl groups from the 1,4-butanediol unit (b2).

The polyester polyol (B) has a number-average molecular weight of 1500 to 3000, preferably 1800 to 2500. Having the average molecular weight of this range gives an excellent reactivity at the time of copolymerization, and also allows the obtained copolymerized polyester resin to demonstrate excellent performance as a film for coating a metal sheet. On the other hand, if the average molecular weight is less than 1500, while good reactivity at the time of copolymerization will still be observed, the obtained copolymerized polyester resin tends to show poor characteristics in score processing when used as a protective film for the inner and outer surfaces of a metal sheet. If the average molecular weight exceeds 3000, the reactivity at the copolymerization becomes poor, and a copolymerized polyester resin having a desired molecular weight will rot be obtained.

The polyester polyol (B) can be obtained by inducing an esterification reaction of the hydrogenated dimer acid unit (b1) with the 1,4-butanediol unit (b2) by a known method, but this requires adjustment of the molar ratio for the reaction so that the terminal turns to a hydroxyl group. In another instance, a commercial product may be employed as the polyester polyol (B). For example, there exists a commercially available product named Priplast3199 (manufactured by Croda) as the polyester polyol including a hydrogenated dimer acid and 1,4-butanediol and having a number-average molecular weight of 2200. Other commercially available polyester polyol products are Priplast3162, 3192, 3196, 2101, and 2104 (all from Croda), etc.

[Copolymerized Polyester Resin]

The dimer acid-copolymerized polyester resin described above can be obtained by inducing the copolymerization reaction of 50 to 93 mass % of the ester oligomer (A) with 7 to 50 mass % of the polyester polyol (B). Here, the polyester polyol (B) accounts for a content of 7 to 50 mass %, preferably 15 to 35 mass %, of the entire polymer. The content of the polyester polyol (B) being within this range provides excellent copolymerization reactivity, and allows the obtained copolymerized polyester resin to exhibit particularly good score processing characteristics when used as a protective film for the inner and outer surfaces of a metal sheet. Moreover, since the copolymerized polyester resin is obtained with the polyester polyol (B) randomly bonded within its polymer chains, it has a clear and colorless, or clear and slightly yellow, appearance. On the other hand, if the content of the polyester polyol (B) is less than 7 mass %, the score processing characteristics at the application to a protective film for the inner and outer surfaces of a metal sheet could be degraded. Also, if the content of the polyester polyol (B) exceeds 50 mass %, the copolymerization reactivity becomes poor and the obtained copolymerized polyester resin could show a whitish appearance as involving phase separations of the polyester polyol (B).

The copolymerization reaction of the ester oligomer (A) and the polyester polyol (B) may be carried out by a conventionally known method. For example, a reaction system obtained by mixing each component is gradually depressurized from the atmospheric pressure to a highly vacuum condition of 133.3 Pa or below, and the series of reactions may be carried out under this condition. Desirably, the temperature during the reactions should be controlled between 250° C. and 270° C. if the temperature exceeds 270° C., a decrease in viscosity due to deterioration may occur in the later stage of the copolymerization reaction, and if the temperature is below 250° C., the copolymerization reaction may not proceed. The copolymerization reaction may employ a polymerization catalyst such as antimony trioxide, germanium dioxide, or a titanium compound, and it is preferable to use, among these, the titanium compound such as tetrabutyl titanate or tetraisopropoxy titanate from the viewpoint of reactivity, safety, and costs. The dimer acid-copolymerized polyester resin described above is not particularly limited to a specific limiting viscosity, but preferably has a limiting viscosity of 0.7 to 0.9.

Another method for obtaining the dimer acid-copolymerized polyester resin may be to esterify dicarboxylic acids containing 70 to 97 mol % of a terephthalic acid component and 30 to 3 mol % of a dimer acid component with diols containing 90 mol % or more of an ethylene glycol component by a known method.

The dimer acid-copolymerized polyester resin may also contain a dicarboxylic acid unit other than the terephthalic acid component and the dimer acid component within a range that does not impair the adequacy of lamination to the metal sheet and the properties of the can lid, for example, within a range of 10 mol % or less. Examples of such a dicarboxylic acid unit include isophthalic acid, succinic acid, adipic acid, azelaic acid, sebacic acid, 1,4-naphthalene dicarboxylic acid, 4,4'-biphenyl dicarboxylic acid, 1,12-dodecanoic acid, 1,2-cyclohexane dicarboxylic acid, 1,3-cyclohexane dicarboxylic acid, 1,4-cyclohexane dicarboxylic acid, and so on, any one of which may be used independently or two or more of which may be used in combination.

Also, the dimer acid-copolymerized polyester resin may contain a diol unit other than the ethylene glycol component within a range of 10 mol % or less. Examples of such a diol unit include aliphatic diols such as diethylene glycol, triethylene glycol, 1,2-propanediol, 1,3-propanediol, 1,4-butanediol, 1,5-pentanediol, 1,6-hexanediol, and neopentyl glycol, alicyclic diols such as 1,4-cyclohexanedimethanol and 1,4-cyclohexanediethanol, and so on, any one of which may be used independently or two or more of which may be used in combination.

The dimer acid-copolymerized polyester resin described above may be used alone in the form of a film, or may be blended with one or more other polyester resins for use. Such other polyester resins are, for example, a polyethylene terephthalate resin, an isophthalic acid-copolymerized polyester resin, a polybutylene terephthalate resin, a polytrimethylene terephthalate resin, and so on, and any one of them may be blended alone, or multiple of them may be blended together, in a proportion of less than 50 mass % with respect to the dimer acid-copolymerized polyester resin.

2-1-3. Outer Layer 21c

The outer layer 21c may be a resin film containing, at a content of, e.g., 50 to 100 mass %, an isophthalic acid-copolymerized polyester resin that contains 3 to 15 mol % of isophthalic acid with respect to the total acid content in the outer layer 21c. The outer layer 21c may have the same composition as the inner layer 21b.

It is possible for the copolymerized polyester resins of the inner layer 21b, the intermediate layer 21a, and the outer layer 21c to have added to them a metallic salt such as magnesium acetate, calcium acetate, or magnesium chloride as an additive, to gain the property of stable electrostatic adhesion to a cooling roll used in the formation of a melt-extruded film. In addition, it is also possible to mix an appropriate amount of inert particles such as silica, alumina, calcium carbonate, or titanium dioxide as an anti-blocking agent for a film roll, such inert particles preferably having an average particle diameter of 1.0 to 4.0 μm. The average particle diameter of less than 1.0 μm would incur degradation of the anti-blocking property, and the average particle diameter of greater than 4.0 μm would cause dropping-off of the particles due to abrasion or film breakage under the stretching process.

The copolymerized polyester resins of the inner layer 21b, the intermediate layer 21a, and the outer layer 21c may also contain, as needed, an additive such as a coloring pigment, wax, a heat stabilizer, an antioxidant, or an ultraviolet absorber. The antioxidant may be a hindered phenol-based antioxidant, a phosphorus-based antioxidant, a sulfur-based antioxidant, etc., but the hindered phenol-based antioxidant is particularly preferable. More than one type of such antioxidants may be added in combination. Also, the content of the antioxidant is preferably 100 to 5000 ppm.

2-1-4. Laminate Film

The first resin film 21 can be obtained by laminating the copolymerized polyester resins of the inner layer 21b, the intermediate layer 21a, and the outer layer 21c by a known method. For example, this method may be a method of feeding the copolymerized polyester resin of the inner layer 21b, that of the intermediate layer 21a, and that of the outer layer 21c into respective, different extruders and co-extruding them from a single die simultaneously (co-extrusion laminating). Or, the method may be a method of preparing a film of the inner layer 21b (or the outer layer 21c) in advance by a T-die process or an inflation process, melt-extruding the copolymerized polyester resin of the intermediate layer 21a onto the surface of this film being conveyed, solidifying the resulting product by cooling, melt-extruding the copolymerized polyester resin of the outer layer 21c (or the inner layer 21b) onto the surface of the obtained two-layered film being conveyed, and solidifying the resulting product by cooling (extrusion laminating). The first resin film 21 is not particularly limited to a specific thickness, but the sum of the thicknesses of the inner layer 21b, the intermediate layer 21a, and the outer layer 21c is preferably 9 to 60 μm.

2-2. Second Resin Film 22

The second resin film 22 may be a resin film containing a polybutylene terephthalate resin at a content of, for example, 50 to 100 mass %.

The polybutylene terephthalate resin can be obtained by causing condensation polymerization of a dicarboxylic acid unit, containing 90 to 100 mol % of a terephthalic acid component, with a diol unit containing 90 to 100 mol % of a 1,4-butanediol component.

The polybutylene terephthalate resin may contain a dicarboxylic acid unit other than the terephthalic acid component within a range that does not deteriorate the effect of preventing partial whitening due to crystallization of the resin film, for example, within a range of 10 mol % or less. Examples of such a dicarboxylic acid unit include succinic acid, adipic acid, azelaic acid, sebacic acid, 1,4-naphthalene dicarboxylic acid, 4,4'-biphenyl dicarboxylic acid, 1,12-dodecanoic acid, 1,2-cyclohexane dicarboxylic acid, 1,3-cyclohexane dicarboxylic acid, 1,4-cyclohexane dicarboxylic acid, and so on, any one of which may be used independently or two or more of which may be used in combination.

The polybutylene terephthalate resin may also contain a diol unit other than the 1,4-butanediol component within a range that does not deteriorate the effect of preventing partial whitening due to crystallization of the resin film, for example, within a range of 10 mol % or less. Examples of such other diol unit include aliphatic diols such as ethylene glycol, diethylene glycol, triethylene glycol, 1,2-propanediol, 1,3-propanediol, 1,5-pentanediol, 1,6-hexanediol, and neopentyl glycol, alicyclic diols such as 1,4-cyclohexanedimethanol and 1,4-cyclohexanediethanol, and so on, any one of which may be used independently or two or more of which may be used in combination.

The second resin film 22 may be a film formed of the above-described polybutylene terephthalate resin alone, but it is preferable to obtain it by blending a polyethylene terephthalate resin or isophthalic acid-copolymerized polyester which 3 to 15 mol % of the dicarboxylic acid content is isophthalic acid) together, while keeping the above-described polybutylene terephthalate resin at a content of 50 mass % or more (preferably in a range of 60 to 90 mass %). In addition, the additives noted in relation to the first resin film 21, that is, the additives that may be added to the copolymerized polyester resins of the inner layer 21*b*, the intermediate layer 21*a*, and the outer layer 21*c* may also be added to the polybutylene terephthalate resin of the second resin film 22.

The first resin film 21 and the second resin film 22 described above can be laminated on the surfaces of the metal sheet 20 by a known method so that the manufacture of the laminate metal sheet is done.

EXAMPLES

The present invention will be described based on examples. The examples have adopted the following measurement method and evaluation method.

(1) Crystal State

Refractive indexes were measured with an Abbe refractometer, and a plane orientation coefficient of 0.05 or less was deemed substantially amorphous.

[Plane orientation coefficient]=[(Refractive index in vertical direction)=(Refractive index in horizontal direction)]/2−[Refractive index in thickness direction]

(2) Lid's Inner Surface Quality (ERV)

A can lid was fixed to one side of a cylindrical jig that opens on both sides, with the inner surface of the can lid facing inward. A saline solution of 3% concentration was poured in from the other open side. A plus terminal was provided to contact with a part of the lid's outer surface where the film was peeled off, while a minus terminal was immersed in the saline solution. A voltage of 6V was then applied to both the terminals for 3 seconds, and the maximum value of the current at that time was measured. The value 0 mA indicates no defects in the resin film, and is most preferable.

(3) Appearance of Score Part After Lid's Opening

Raising and pulling the opening tab causes the cleavage along the score line, and thus the lid to open. The case where the steel sheet and the film were torn substantially along the score line was evaluated to be "○", and the case where the appearance was poor due to the cut edge of the film being displaced from the cut edge of the steel sheet by 1 mm or more, or meandering, was evaluated to be "×".

(4) Content Storage Test

A metal three-piece food can was filled with contents, heated at 90° C., and then closed with its lid rolled and clamped. The can was subjected to a predetermined retort sterilization treatment and stored at room temperature for one year, after which the lid's inner surface was evaluated for corrosive state. The case where corrosion reached 50% or less of the thickness of the steel sheet was evaluated to be "○", the case where the corrosion exceeded 50% was evaluated to be "Δ", and the case where the corrosion resulted in perforation was evaluated to be "×".

(5) Appearance After Retort Treatment

The content was put, and a retort treatment was conducted under predetermined conditions. Then, the outer surface of the can lid was visually observed. The case where no white spot occurred was evaluated to be "○", and the case where a white spot occurred was evaluated to be "Δ".

Can lids according to Examples 1 to 7 were prepared and subjected to the above evaluations. Tables 1 to 3 summarize Examples 1 to 7 altogether. Table 1 shows the composition of the resin film on the inner surface side of the respective can lid. Table 2 shows the composition of the resin film on the outer surface side of the respective can lid. Table 3 shows the evaluation results.

TABLE 1

| | Inner surface side of can lid Inner film (first resin film) of can lid | | | | | | | |
|---|---|---|---|---|---|---|---|---|
| | Intermediate layer (first resin layer) | | | | | | Outer layer (second resin layer) | |
| | Synthesis from ester oligomer and polyester polyol | | Synthesis from acid and diol | | | | | |
| | Ester | polyester | Acid | | Diol | | Dimer | |
| | oligomer (mass %) | polyol (mass %) | TPA (mol %) | Dimer acid (mol %) | EG (mol %) | Thickness (μm) | acid (mol %) | TPA (mol %) | IPA (mol %) |
| Ex. 1 | 65 | 35 | — | — | — | 10 | 21 | 90 | 10 |
| Ex. 2 | 65 | 35 | — | — | — | 10 | 21 | 90 | 10 |
| Ex. 3 | 65 | 35 | — | — | — | 20 | 21 | — | — |
| Ex. 4 | — | — | 93.5 | 6.5 | 100 | 20 | 6.5 | — | — |
| Ex. 5 | 65 | 35 | — | — | — | 10 | 21 | 90 | 10 |

TABLE 1-continued

| | | | | | | | | | |
|---|---|---|---|---|---|---|---|---|---|
| Ex. 6 | — | — | 100 | 0 | 100 | 10 | 0 | 90 | 10 |
| Ex. 7 | 65 | 35 | — | — | — | 10 | 21 | 90 | 10 |

| | Inner surface side of can lid | | | | | | | Dimer acid |
|---|---|---|---|---|---|---|---|---|
| | Inner film (first resin film) of can lid | | | | | | | ratio to total dicarboxylic acid |
| | Outer layer (second resin layer) | | Inner layer (third resin layer) | | | | | |
| | EG (mol %) | Thickness (μm) | TPA (mol %) | IPA (mol %) | EG (mol %) | Thickness (μm) | Crystal state | content in film (mol %) |
| Ex. 1 | 100 | 5 | 90 | 10 | 100 | 5 | Amorphous | 10.5 |
| Ex. 2 | 100 | 10 | — | — | — | — | Amorphous | 10.5 |
| Ex. 3 | — | — | — | — | — | — | Amorphous | 21 |
| Ex. 4 | — | — | — | — | — | — | Amorphous | 6.5 |
| Ex. 5 | 100 | 5 | 90 | 10 | 100 | 5 | Oriented crystallization due to biaxial stretching | 10.5 |
| Ex. 6 | 100 | 5 | 90 | 10 | 100 | 5 | Amorphous | 0 |
| Ex. 7 | 100 | 5 | 90 | 10 | 100 | 5 | Amorphous | 10.5 |

TABLE 2

| | Outer surface side of can lid | | | |
|---|---|---|---|---|
| | Outer film (second resin film) of can lid | | | |
| | Blended resin | | | |
| | PET-I (mass %) *Isophthalic acid: 10 mol % | PBT (mass %) | Thickness (μm) | Crystal state |
| Ex. 1 | 40 | 60 | 12 | Amorphous |
| Ex. 2 | 40 | 60 | 12 | Amorphous |
| Ex. 3 | 40 | 60 | 12 | Amorphous |
| Ex. 4 | 40 | 60 | 12 | Amorphous |
| Ex. 5 | 40 | 60 | 12 | Oriented crystallization due to biaxial stretching |
| Ex. 6 | 40 | 60 | 12 | Amorphous |
| Ex. 7 | 60 | 40 | 12 | Amorphous |

TABLE 3

| | Evaluation result | | | | | |
|---|---|---|---|---|---|---|
| | | | | Content storage test (room temperature × 1 year) | | |
| | Lid's inner surface quality | Appearance of score part after lid's opening | | Tomato sauce pH 3.93 Cl⁻ 9800 ppm | Green beans pH 5.96 Cl⁻ 5000 ppm | Appearance after |
| | ERV (mA) | Inner surface | Outer surface | Retort 110° C. × 16 min | Retort 127° C. × 60 min | retort treatment |
| Ex. 1 | <0.5 | ○ | ○ | ○ | ○ | ○ |
| Ex. 2 | <0.5 | ○ | ○ | ○ | ○ | ○ |
| Ex. 3 | <0.5 | ○ | ○ | ○ | ○ | ○ |
| Ex. 4 | <0.5 | ○ | ○ | ○ | ○ | ○ |
| Ex. 5 | <0.5 | x Film remained | x Film remained | ○ | ○ | ○ |
| Ex. 6 | 1 to 5 | ○ | ○ | x Perforated | Δ Corroded | ○ |
| Ex. 7 | <0.5 | ○ | ○ | ○ | ○ | Δ White spots |

Example 1

An ester oligomer having a number-average molecular weight of 340 was prepared by the esterification reaction between terephthalic acid (TPA) and ethylene glycol (EG). The ester oligomer was then added with polyester polyol (trade name: Priplast3199, manufactured by Croda) having a number-average molecular weight of 2200 and constituted by hydrogenated dimer acid and 1,4-butanediol. The mixture was heated while being stirred, and subjected to a copolymerization reaction under reduced pressure until reaching a predetermined viscosity. A pellet of the copolymer was obtained by a known method. The copolymer thus obtained may also be called "hydrogenated dimer acid copolymer" in the following explanation. A known co-extrusion film production process was performed so that a three-layered film having this resin as an intermediate layer and a 10 mol % isophthalic acid (IPA)-copolymerized PET resin as layers arranged on the respective sides was obtained with a thickness of the intermediate layer set to 10 μm and thicknesses of the inner and outer layers each set to 5 µm. The three-layered film was coated with a polyester-based adhesive at a coating amount of 1.5 g/m² by known gravure coating means to obtain a coated film.

Meanwhile, a known film production process was performed so that a resin film constituted by a mixture of 40 mass % of a 10 mol % isophthalic acid-copolymerized PET resin (PET-I) and 60 mass % of a polybutylene terephthalate resin (PET) was obtained with a thickness of 12 µm.

These two types of films were simultaneously bonded in a thermo-compression manner to the respective surfaces of a heated tin-free steel sheet having a thickness of 0.19 mm by a known thermal lamination process. After that, the laminate metal sheet was heated to a temperature of 260° C. to melt the films, and then rapidly cooled with air blowing at a speed of 30 m/sec to turn the films on the steel sheet into an amorphous state. Lid formation was conducted with the above three-layered film arranged as an inner surface of the can lid, and score lines were given at the corresponding predetermined positions on the inner and outer surfaces of the lid to make a score residual thickness of about 50 µm, so that a groove having an arc-shaped cross section was formed on the lid. Thereafter, the test lid was obtained upon attachment of an opening tab by a known method.

The crystal states of the inner and outer film of the lid were evaluated as explained above. The inner surface quality of the lid and the appearance of the score part after opening the lid were also evaluated as explained above. In addition, the lid was rolled and clamped to each of a metal three-piece can body filled with tomato sauce and a metal three-piece can body filled with green beans. The tomato sauce was subjected to a retort treatment at 110° C. for 16 minutes, and the green beans were subjected to a retort treatment at 127° C. for 50 minutes. They then underwent a storage test at room temperature for one year, and were subsequently evaluated. The appearance of the can lid was also evaluated after the retort treatment as explained above. No sign of problems appeared in any of the evaluation results.

Example 2

In Example 2, a two-layered film was used as the inner film of the lid. More specifically, the lid was prepared in the same manner as Example 1, except that after obtaining a pellet of the hydrogenated dimer acid copolymer, a known film production process was performed so that the two-layered film constituted by a layer of the hydrogenated dimer acid copolymer resin and a layer of the 10 mol % isophthalic acid-copolymerized PET resin was obtained, and that the layer of the hydrogenated dimer acid copolymer was arranged to face the surface of the steel sheet at lamination. Note, additionally, that the film producing process here adopted a lower stretching temperature and a 30%-reduced film forming rate as compared to those of Example 1 in order to prevent the film from being sticky and winding around the stretching roll. It transpired that all evaluation results were problem-free.

Example 3

In Example 3, a single-layer film was used as the inner film of the lid. More specifically, the lid was prepared in the same manner as Example 1, except that after obtaining a pellet of the hydrogenated dimer acid copolymer, a known film production process was performed so that the single-layer film was obtained from the hydrogenated dimer acid copolymer resin. Note that the film producing process here adopted a lower stretching temperature and a 30%-reduced film forming rate as compared to those of Example 1 in order to prevent the film from being sticky and winding around the stretching roll. Also, the lid formation speed was reduced by 20% from Example 1 as a measure for preventing scratches on the inner surface of the lid during its formation. It transpired that all the evaluation results were problem-free.

Example 4

Example 4 employed a hydrogenated dimer acid copolymer which differed in type from the hydrogenated dimer acid copolymer used in each of Examples 1 to 3. Also in Example 4, a single-layer film was used as the inner film of the lid. More specifically, the lid was prepared in the same manner as Example 3, except that the single-layer film of a 6.5 mol % hydrogenated dimer acid-copolymerized PET resin was obtained. It transpired that all the evaluation results were problem-free.

Example 5

In Example 5, the heat treatment for transforming the lid's inner film and outer film into an amorphous state was omitted, and as such, these films exhibited oriented crystallization according to biaxial stretching. More specifically, the lid was prepared in the same manner as Example 1, except that after bonding the two types of films to the respective surfaces of the heated steel sheet in a thermo-compression manner, no heat treatment using a temperature equal to or higher than the melting point of the films was performed.

It transpired that, after the lid opening, a part of the edge of each film was displaced by at most 3 mm from the metal edge in the score part, and the films also exhibited an undesirable appearance with the cut edge of the film meandering. Such a result was considered attributable to the films involving oriented crystals formed therein during the film formation, which served to increase their breaking strength while introducing directional variations in their breaking strength. It was thus assumed that the adhesion strength of the film to the steel sheet were overwhelmed by the breaking strength, and the films were broken as delamination (interlayer peeling) progressed.

Example 6

In Example 6, the lid was prepared in the same manner as Example 1, except that the hydrogenated dimer acid copolymer was not used and a homo-PET resin was used.

It turned out that in both the cases of the tomato sauce and the green beans, there was severe corrosion after the storage test at room temperature for one year, and the can lid according to Example 6 was found impossible to use. Such a result was considered attributable to the omission of the hydrogenated dimer acid copolymer from the layer structure of the films. It was assumed that this omission was accompanied by physical properties incapable of absorbing the compressive force applied during the formation of the score lines, and that cracking was permitted to occur.

Example 7

In Example 7, the lid was prepared in the same manner as Example 1, except that the lid's outer film was replaced with a resin film constituted by a mixture of 60 mass % of a 10 mol % isophthalic acid-copolymerized PET resin and 40 mass % of a polybutylene terephthalate resin (PBT).

It transpired that the retort treatment caused the formation of white spots on the outer surface of the lid. There was a tendency for white spots to easily occur when the proportion of the PET component was decreased. Such a result was considered attributable to the PET component no longer included as a main component, which accordingly slowed down the crystallization speed and degraded the resistance to water vapor during the sterilization.

It is known that white spots occur more easily when the retort treatment is performed at a higher temperature or for a longer period of time. The retort treatment in Example 7 was indeed performed at a high temperature and for a long period of time. As such, performing the retort treatment at a lower temperature and for a shorter period of time would be an apparent solution for reducing or suppressing the occurrence of white spots. Also, formation of only a few white spots would be unproblematic provided that this does not harm the product value. In specific instances where a high-temperature and long-time retort sterilization treatment is required, or reliable prevention of the occurrence of white spots is desired, it is therefore preferable to set the proportion of the PBT component in the outer resin film to be 50 mass % or more.

REFERENCE SIGNS LIST

1 . . . Can lid, 2 . . . Main body, 3 . . . Tab, 4 . . . Panel portion, 5 . . . Chuck wall, 6 . . . Flange, 7 . . . Rivet, 8 . . . Finger hook, 9 . . . Attachment portion, 10 . . . Nose, 11 . . . Finger hook recess, 12 . . . Opening piece, 13 . . . Score line, 13a . . . Main portion, 13b . . . Rivet-approximated portion, 13c . . . Connecting portion, 14 . . . Outer peripheral bead, 15 . . . Support portion, 16 . . . Outer score line, 16a . . . First groove, 16b . . . Second groove, 16c . . . Flat portion, 17 . . . Inner score line, 18 . . . Inner peripheral bead, 19 . . . Reinforcing recess, 20 . . . Metal sheet, 21 . . . First resin film, 21a . . . Intermediate layer, 21b . . . Inner layer, 21c . . . Outer layer, 22 . . . Second resin film, O . . . Center.

The invention claimed is:

1. A can lid comprising:
a main body comprising a laminate metal sheet, the laminate metal sheet comprising a metal sheet and a first resin film on a major surface of the metal sheet, the major surface having a score line delimiting an opening piece, the first resin film comprising
a first resin layer,
a second resin layer comprising an isophthalic acid-copolymerized polyester resin as an outermost layer of the main body, and
a third resin layer comprising an isophthalic acid-copolymerized polyester resin as a layer interposed between the metal sheet and the first resin layer and in contact with the metal sheet,
the first resin film being amorphous, and
among the first, second and third resin layers constituting the first resin film, only the first resin layer comprising a dimer acid, the first resin layer comprising the dimer acid in a form of a dimer acid-copolymerized polyester resin; and
a tab attached to the main body and adapted to cause a cleavage along the score line.

2. The can lid according to claim 1, wherein the score line forms a groove having an arc-shaped cross section.

3. The can lid according to claim 1, wherein the tab is attached to a surface opposite to the major surface.

4. The can lid according to claim 1, wherein the laminate metal sheet further comprises a second resin film on a surface opposite to the major surface of the metal sheet.

5. The can lid according to claim 4, wherein the second resin film comprises a polybutylene terephthalate resin.

6. The can lid according to claim 1, wherein a surface opposite the major surface of the metal sheet has a further score line at a position corresponding to the score line.

7. The can lid according to claim 6, wherein the further score line of the surface opposite to the major surface forms a groove having an arc-shaped cross section.

8. The can lid according to claim 1, wherein the metal sheet and the first resin film are bonded to each other by an adhesive.

9. The can lid according to claim 8, wherein the adhesive is free from a bisphenol-A epoxy resin.

10. The can lid according to claim 1, wherein the metal sheet is a steel sheet.

* * * * *